US008959207B2

(12) United States Patent
Huang et al.

(10) Patent No.: US 8,959,207 B2
(45) Date of Patent: Feb. 17, 2015

(54) STATE TRACKING SYSTEM VIA SOCIAL NETWORK INTERFACE AND METHOD THEREOF

(75) Inventors: Polly Huang, Taipei (TW); Chun-Chieh Hsiao, New Taipei (TW); Sung-Hwa Tsai, Taipei (TW); Yi-Hsien Lin, New Taipei (TW)

(73) Assignee: National Taiwan University, Taipei (TW)

( * ) Notice: Subject to any disclaimer, the term of this patent is extended or adjusted under 35 U.S.C. 154(b) by 146 days.

(21) Appl. No.: 13/440,950

(22) Filed: Apr. 5, 2012

(65) Prior Publication Data

US 2013/0111017 A1  May 2, 2013

(30) Foreign Application Priority Data

Oct. 26, 2011  (TW) .............................. 100138905 A

(51) Int. Cl.
G06F 15/173 (2006.01)
G06Q 10/08 (2012.01)
G06Q 50/00 (2012.01)
G06F 15/16 (2006.01)
G08B 21/04 (2006.01)

(52) U.S. Cl.
CPC ............ *G06Q 10/0833* (2013.01); *G06Q 50/01* (2013.01); *G08B 21/0423* (2013.01); *G08B 21/0492* (2013.01)
USPC ......................................... 709/224; 709/204

(58) Field of Classification Search
USPC .......................................................... 709/224
See application file for complete search history.

(56) References Cited

U.S. PATENT DOCUMENTS

| 2010/0299278 | A1* | 11/2010 | Kriss et al. ..................... 705/332 |
| 2011/0060807 | A1* | 3/2011 | Martin et al. .................. 709/217 |
| 2011/0125844 | A1* | 5/2011 | Collier et al. ................. 709/204 |

OTHER PUBLICATIONS

Li et al., Sharing Location in Online Social Networks, 2010, pp. 20-23.*

* cited by examiner

*Primary Examiner* — Hee Soo Kim
(74) *Attorney, Agent, or Firm* — Huffman Law Group, PC

(57) ABSTRACT

An embodiment of present disclosure provides a state tracking system via a social network interface comprising a detecting module, a state information processing module, and a social network interface. The detecting module can detect at least one tracking target according to a detecting frequency to obtain the state information of the tracking target. The state information processing module can receive the state information and determine whether the present state information of the tracking target is different from the previous state information of the tracking target. If the present state information is different from the previous state information, the state information processing module releases the present state information on the social network interface. If the present state information is the same as the previous state information, the state information processing module does not release the present state information on the social network interface.

11 Claims, 4 Drawing Sheets

STATE TRACKING SYSTEM VIA SOCIAL NETWORK INTERFACE AND METHOD THEREOF

CROSS-REFERENCE TO RELATED APPLICATION(S)

This application claims priority to Taiwan Patent Application No. 100138905 entitled "STATE TRACKING SYSTEM VIA SOCIAL NETWORK INTERFACE AND METHOD THEREOF," which was filed on Oct. 26, 2011, and is hereby incorporated by reference in its entirety.

FIELD OF THE EMBODIMENTS

This disclosure relates to a state tracking system and a method thereof, and more specifically, a state tracking system via a social network interface and a method thereof.

BACKGROUND

In recent years, some social network user interfaces, such as Facebook®, Weibo®, Twitter®, and the like, have become new channels for receiving information. A user of a social network interface can manually input his present state information into the social network interface immediately, wherein the state information can comprise user's present position or behavior, so that user's family members or friends can immediately know the user's state information via the social network interface. However, it is difficult for some persons who do not understand how to use computers and networks to input their present state information into the social network interface manually. Therefore, there is a need for an improved state tracking system and a method thereof that can solve these drawbacks.

SUMMARY

At least one purpose of the present disclosure provides a state tracking system via a social network interface and a method thereof. When the state information of the tracking target (such as a person or a goods) changes, the changing state information will be automatically released on the social network interface, and the user will not be required to input the changing state information into the social network interface manually, so that it is more convenient for people to observe the state information of the tracking target. Therefore, the present tracking system can designate a special user, and only the set special user is allowed to observe the state information of the tracking target, so the state tracking system can protect the tracking target's state information.

The present application provides a state tracking system via a social network interface. According to one embodiment, the tracking system includes a detecting module, a social network interface, and a state information processing module. The detecting module automatically detects at least one tracking target to obtain the present state information of the tracking target according to a detecting frequency. The state information processing module receives the present state information of the tracking target and determines whether the present state information of the tracking target is different from the previous state information of the tracking target. If the present state information is different from the previous state information, the state information processing module automatically releases the present state information on the social network interface via a network; however, if the present state information is the same as the previous state information, the state information processing module does not release the present state information on the social network interface.

The present application further provides a state tracking method via a social network interface. According to one embodiment, the steps of the tracking method comprise detecting at least one tracking target to obtain a present state information of the tracking target automatically according to a detecting frequency and receiving the present state information of the tracking target and determining whether the present state information of the tracking target is different from the previous state information of the tracking target. If the present state information is different from the previous state information, the method will release the present state information on the social network interface automatically via a network; however, if the present state information is the same as the previous state information, the method will not release the present state information on the social network interface.

DETAILED DESCRIPTION

Figure 1:
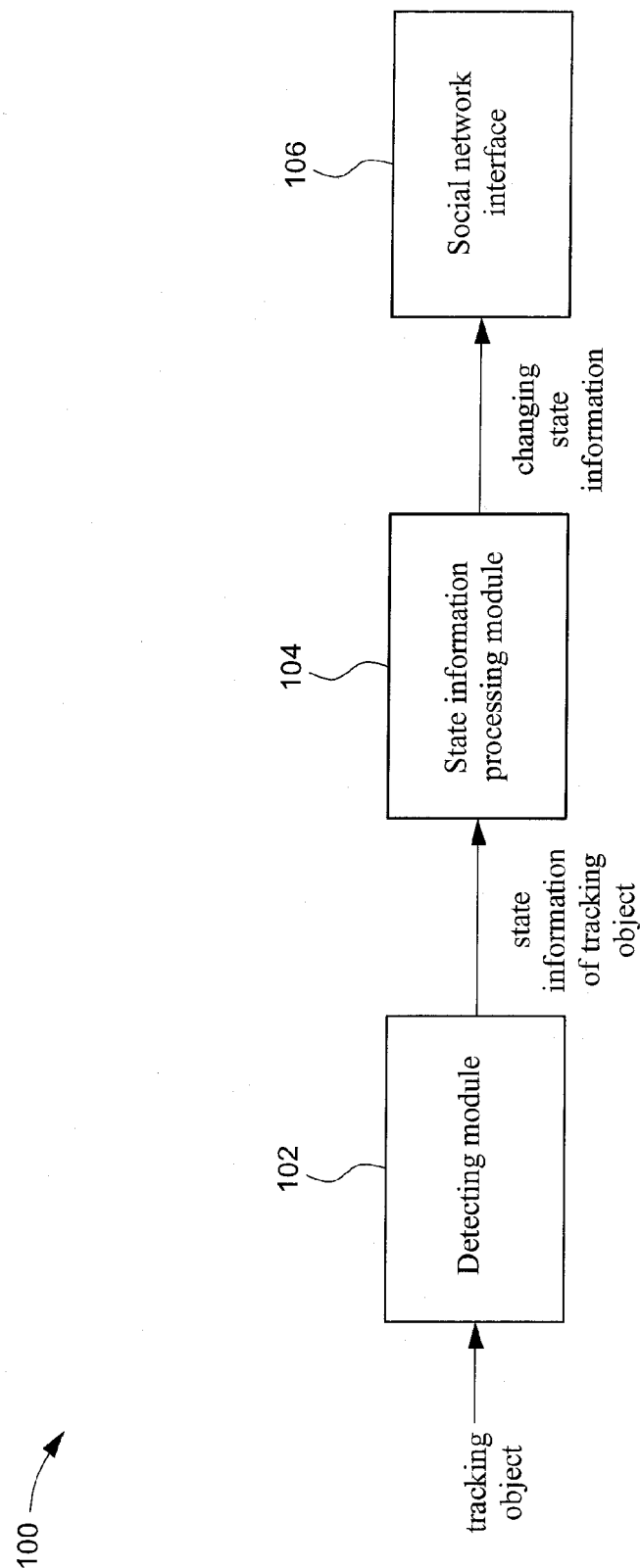
FIG. 1 is a block diagram illustrating one embodiment of a state tracking system via a social network interface, in accordance with one aspect of the present disclosure.

As shown in FIG. 1, this present disclosure provides a state tracking system 100. The state tracking system 100 comprises a detecting module 102, a state information processing module 104, and a social network interface 106. The detecting module 102 automatically detects at least one tracking target to obtain a present state information of the tracking target according to a preset detecting frequency. For example, the preset detecting frequency can be 5 minutes. In one embodiment of the present disclosure, the tracking target can be a person, and the state information of the person can comprise his physiology condition (such as his blood pressure, his body temperature, etc.), his position, and his behavior (such as walking, sleeping, etc.). In another embodiment of the present disclosure, the tracking target can be goods, and the state information of the goods includes the position of the goods, the orientation of the goods, the movement of the goods, the temperature of the goods, the vibration of the goods, the visual image of the goods, the audio sound of the goods, the operating modes of the goods, etc.

The detecting module 102 can send the present state information of the tracking target to the state information processing module 104 via wireless communication technologies, such that the state information processing module 104 can determine whether the present state information of the tracking target is different from a previous state information of the tracking target. If the present state information of the tracking target is different form the previous state information of the tracking target, such as if the previous state information detected that the tracking target was walking and the present state information detects that the tracking target is sleeping, then the state information processing module 104 can automatically release the changing state information (the present state information) on the social network interface 106 via a network. Otherwise, if the present state information of the tracking target is the same as the previous state information of the tracking target, the state information processing module 104 does not release the present state information on the social network interface 106 in order to prevent releasing the same content on the social network interface 106 twice.

Furthermore, the state information processing module 104 can designate at least one special user where only the set special user is allowed to observe the state information of the tracking target via the social network interface 106. When the tracking target is a person, the special user can be the person's family member or friend, for example. When the tracking target is a goods, the special user can be the owner of the goods, for example. In addition, the state information processing module 104 can be set to send a message to the special user's mobile device when the state information of the tracking target changes. The special user can then see that the state information of the tracking target has been updated via both the social network interface 106 and by reading the message sent by the state information processing module 104.

Figure 2:
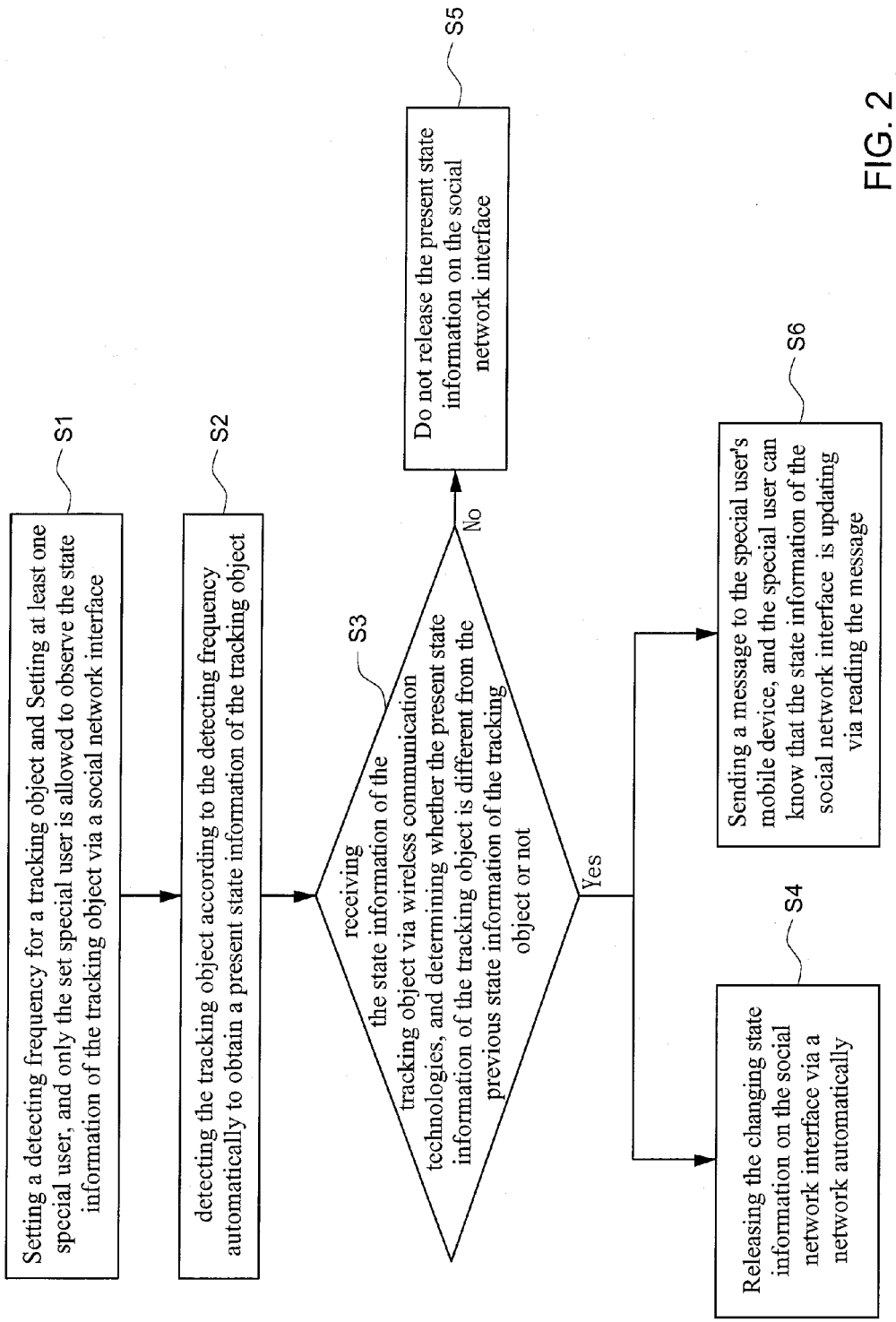
FIG. 2 is a flowchart illustrating one embodiment of a state tracking method via a social network interface, in accordance with one aspect of the present disclosure.

FIG. 2 is a flowchart illustrating one embodiment of a state tracking method via a social network interface. As shown in FIG. 2, the steps of the state tracking method comprise:

Step S1: set a detecting frequency for a tracking target and setting at least one special user, wherein only the set special user is allowed to observe the state information of the tracking target via a social network interface.

Step S2: automatically detect the tracking target according to the detecting frequency to obtain a present state information of the tracking target, wherein the detecting module 102 described above executes the detecting action.

Step S3: receive the state information of the tracking target via wireless communication technologies and determining whether the present state information of the tracking target is different from the last state information of the tracking target. If the present state information of the tracking target is different from the previous state information of the tracking target, then the method will execute Step S4 and Step S6. However, if the present state information of the tracking target is the same as the previous state information of the tracking target, then the method will execute Step S5.

Step S4: automatically release the changing state information (the present state information) on the social network interface 106 via a network, wherein the state information processing module 104 executes this action of releasing the state information.

Step S5: do not release the present state information on the social network interface 106.

Step S6; send a message to the special user's mobile device, wherein the special user can know that the state information of the social network interface 106 is updated via reading the message.

Figure 3:
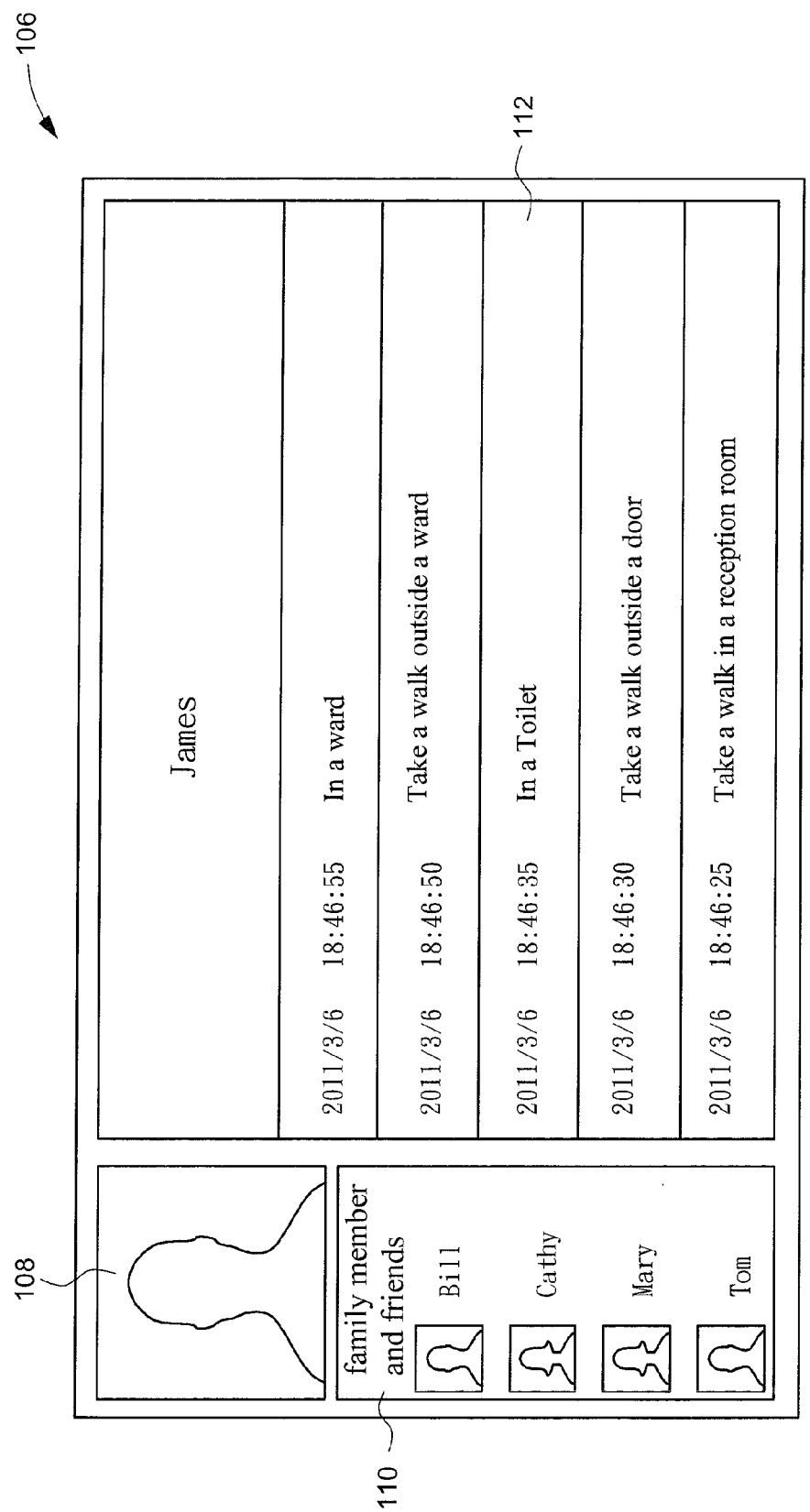
FIG. 3 is a schematic view illustrating a social network interface displaying a state information of a tracking person, in accordance with one aspect of the present disclosure.

FIG. 3 is a schematic view illustrating a social network interface 106 displaying state information of a tracking person. As shown in FIG. 3, the social network interface 106 comprises a tracking target displaying interface 108, a special user displaying interface 110, and a state information displaying interface 112. The tracking target displaying interface 108 can display the static image or the dynamic image of the tracking target. The special user displaying interface 110 can display the static image or the dynamic image of the special user. The state information displaying interface 112 can display the state information of the present tracking target.

In the embodiment shown in FIG. 3, the tracking target displaying interface 108 displays a photo of the present tracking person, James. The special user displaying interface 110 displays the family members and friends of the present tracking person James, such as Bill, Cathy, Mary, and Tom. The state information displaying interface 112 displays the state information of the present tracking person James, and the state information of the tracking person James can comprise the behaviors of the tracking person. For example, on Mar. 6, 2011, James waked outside the ward at 18:46:50.

Figure 4:
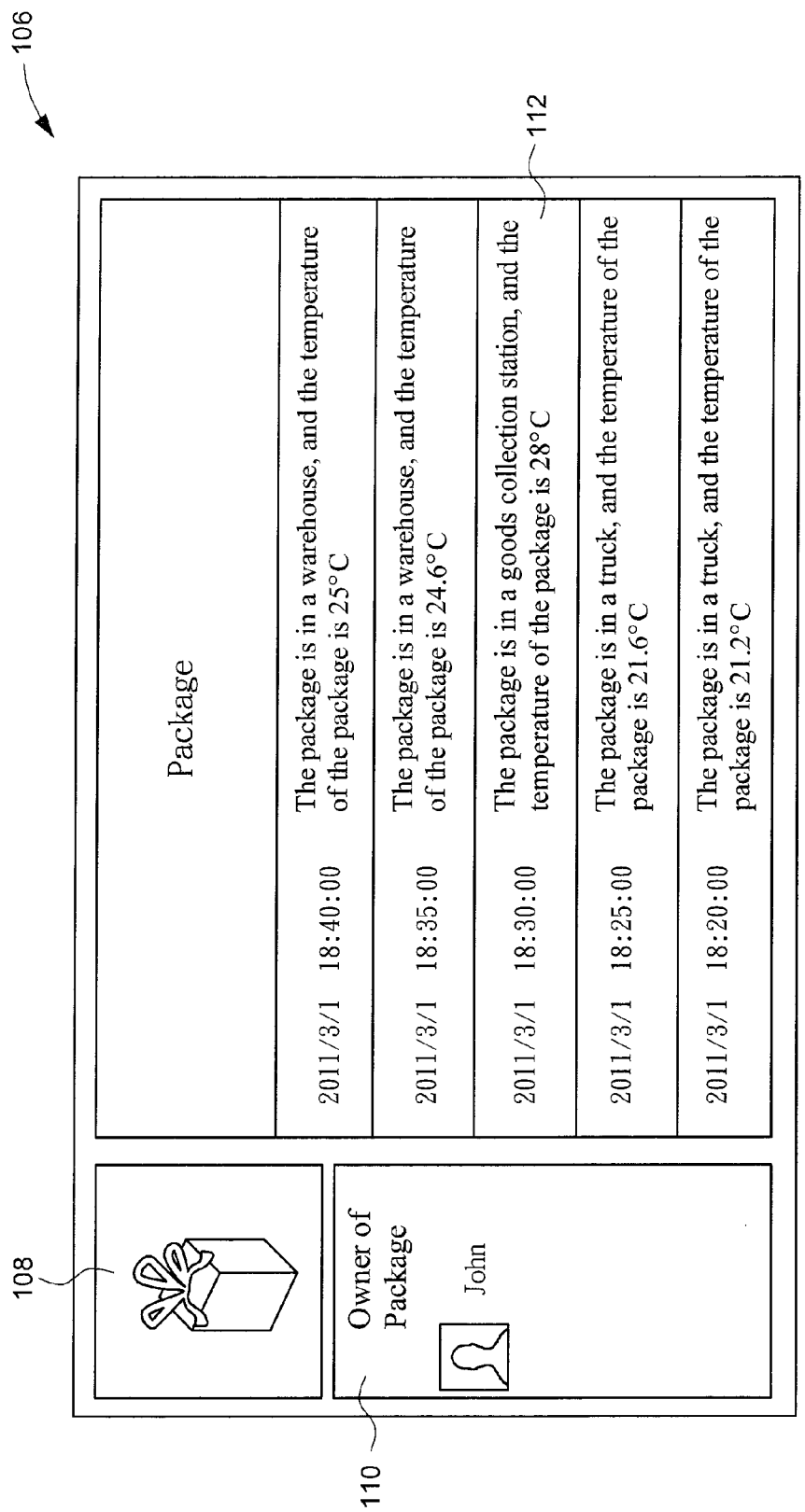
FIG. 4 is a schematic view illustrating a social network interface displaying a state information of a tracking goods, in accordance with one aspect of the present disclosure.

FIG. 4 is a schematic view illustrating the social network interface 106 displaying a state information of a tracking good. As shown in FIG. 4, the tracking target displaying interface 108 can display the picture of the tracked good, such as a package. The special user displaying interface 110 displays the owner of the present tracking good, such as John. The state information displaying interface 112 displays the state information of the present tracking good. The state information of the present tracking good can comprise the temperature of the present tracking good and the position of the present tracking good, such as on Mar. 1, 2011, the package is in a warehouse and the temperature of the package is 25° C. at 18:40:00.

The present disclosure of the state tracking system and method is advantageous for at least the following reasons:

1) When the state information of the tracking target changes, the changing state information will be automatically released on the social network interface. Because no one has to input the changing state information into the social network interface manually, it is more convenient for people to observe the state information of the tracking target.

2) The tracking system can designate a special user, wherein only the set special user is allowed to observe the state information of the tracking target. This allows the state tracking system to be able to protect the tracking target's state information.

As may be used herein, the terms "substantial," "substantially," "approximate," and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A state tracking system via a social network interface comprising:
   at least one tracking target;
   a detecting module automatically detecting the tracking target to obtain a present state information of the tracking target according to a detecting frequency;
   a social network interface, wherein the social network interface comprises a tracking target displaying interface, a special user displaying interface, and a state information displaying interface, the tracking target displaying interface can display the static image or the dynamic image of the tracking target, the special user displaying interface can display the static image or the dynamic image of the special user, and the state information displaying interface can display the state information of the present tracking target;
   a state information processing module receiving the present state information of the tracking target and determining whether the present state information of the tracking target is different from the previous state information of the tracking target, wherein if the present state information is different from the previous state information, the state information processing module automatically releases the present state information on the social network interface via a network; if the present state information is the same as the previous state information, the state information processing module doesn't releases the present state information on the social network interface.

2. The state tracking system according to claim 1, wherein the tracking target is a person and state information comprises the person's physiology condition, position, and behavior.

3. The state tracking system according to claim 1, wherein the tracking target is a goods and the state information comprises the position of the goods, the orientation of the goods, the movement of the goods, the temperature of the goods, the vibration of the goods, the visual image of the goods, the audio sound of the goods, and the operating modes of the goods.

4. The state tracking system according to claim 1, wherein the state information processing module can be set to at least one special user, and only the set special user is allowed to observe the state information of the tracking target via the social network interface.

5. The state tracking system according to claim 4, wherein when the present state information is different from the previous state information, the state information processing module can be set to send a message to the special user's mobile device.

6. A state tracking method via a social network user interface, wherein the social network interface comprises a tracking target displaying interface, a special user displaying interface, and a state information displaying interface, the tracking target displaying interface can display the static image or the dynamic image of the tracking target, the special user displaying interface can display the static image or the dynamic image of the special user, and the state information displaying interface can display the state information of the present tracking target, and the state tracking method comprising the steps of:
   detecting at least one tracking target to obtain a present state information of the tracking target automatically according to a detecting frequency; and
   receiving the previous state information of the tracking target and determining whether the present state information of the tracking target is different from the previous state information of the tracking target, wherein if the present state information is different from the previous state information, release the present state information on the social network interface via a network automatically; if the present state information is the same as the previous state information, don't release the present state information on the social network interface.

7. The state tracking method according to claim 6, wherein the tracking target is a person and the state information includes the person's physiology condition, position, and behavior.

8. The state tracking method according to claim 6, wherein the tracking target is a goods and the state information includes the position of the goods, the orientation of the goods, the movement of the goods, the temperature of the goods, the vibration of the goods, the visual image of the goods, the audio sound of the goods, and the operating modes of the goods.

9. The state tracking method according to claim 6, further comprising a step of setting the detecting frequency.

10. The state tracking method according to claim 6, further comprising a step of setting at least one special user, and only the set special user is allowed to observe the state information of the tracking target via the social network interface.

11. The state tracking method according to claim 10, further comprising a step of sending a message to the special user's mobile device when the present state information is different from the previous state information.

* * * * *